US 12,098,817 B2

United States Patent
Hummel et al.

(10) Patent No.: US 12,098,817 B2
(45) Date of Patent: Sep. 24, 2024

(54) METHOD, SYSTEM, AND COMPUTER PROGRAM PRODUCT FOR STORING LIGHT DISTRIBUTIONS OF A MATRIX HEADLIGHT SYSTEM

(71) Applicant: Dr. Ing. h.c. F. Porsche Aktiengesellschaft, Stuttgart (DE)

(72) Inventors: Benjamin Hummel, Tamm (DE); Dominik Walter, Rutesheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 48 days.

(21) Appl. No.: 17/892,747

(22) Filed: Aug. 22, 2022

(65) Prior Publication Data

US 2023/0089747 A1 Mar. 23, 2023

(51) Int. Cl.
*F21S 41/663* (2018.01)
*B60Q 1/14* (2006.01)
*F21S 41/153* (2018.01)
*F21W 102/13* (2018.01)

(52) U.S. Cl.
CPC ............ *F21S 41/663* (2018.01); *B60Q 1/143* (2013.01); *F21S 41/153* (2018.01); *F21W 2102/13* (2018.01)

(58) Field of Classification Search
CPC ........ F21S 41/663; F21S 41/153; F21S 41/10; F21S 41/151; B60Q 1/143; B60Q 1/1407; B60Q 1/14; B60Q 1/04; B60Q 1/08; F21W 2102/13; H05B 45/44; H04N 19/00
See application file for complete search history.

(56) References Cited

U.S. PATENT DOCUMENTS 6,144,159 A 11/2000 Lopez et al.
9,732,927 B2 8/2017 Hoffmann
(Continued)

FOREIGN PATENT DOCUMENTS

DE 102008062640 7/2009
DE 10201003351 2/2012
(Continued)

OTHER PUBLICATIONS

German Search Report dated Jan. 30, 2023.

*Primary Examiner* — Abdullah A Riyami
*Assistant Examiner* — Syed M Kaiser
(74) *Attorney, Agent, or Firm* — Gerald E. Hespos; Michael J Porco

(57) ABSTRACT

A method is provided for storing light distributions of a matrix headlight system. The method includes loading, from a memory, first control data for lighting means of a first matrix light module for generating a first light distribution; feeding the first control data to a comparison module; loading, from the memory, second control data for the lighting means of the first matrix light module or for lighting means of a second matrix light module for generating a second light distribution and feeding the second control data to a comparison module. The method compares the first and second control data; stores the first control data for the first light distribution if there is a similarity or equality between the first and second control data; and linking the second control data for the second light distribution by means of a link to the control data for the first light distribution.

9 Claims, 3 Drawing Sheets

Tx_citylight_left.pgm

SD1
000, 000, 000, 000, 000, 000, ...
000, 005, 050, 100, 120, 180, ...
000, 010, 080, 150, 190, 255, ...
000, 005, 050, 100, 120, 180, ...
000, 000, 000, 000, 000, 000, ...
...

Tx_citylight_right.pgm 000, 000, 000, 000, 000, 000, ...
000, 005, 050, 100, 120, 180, ...
000, 010, 080, 150, 190, 255, ...
000, 005, 050, 100, 120, 180, ...
000, 000, 000, 000, 000, 000, ...
...
SD2

2x65536px → ca.131kByte

(56) References Cited

U.S. PATENT DOCUMENTS

| | | | |
|---|---|---|---|
| 2013/0242100 A1* | 9/2013 | Seki | F21S 41/663 |
| | | | 348/148 |
| 2013/0257274 A1 | 10/2013 | Sekiguchi | |
| 2013/0258689 A1* | 10/2013 | Takahira | F21S 41/151 |
| | | | 362/465 |
| 2013/0321142 A1 | 12/2013 | Cardoso et al. | |
| 2015/0042225 A1* | 2/2015 | Fukayama | B60Q 1/143 |
| | | | 315/82 |
| 2015/0375672 A1* | 12/2015 | Takahashi | F21S 41/25 |
| | | | 362/510 |
| 2016/0257241 A1 | 9/2016 | Hoffmann | |
| 2020/0156530 A1 | 5/2020 | Kubitza et al. | |
| 2020/0398736 A1 | 12/2020 | Kim | |
| 2021/0029333 A1* | 1/2021 | Naftali | H04N 9/3135 |
| 2021/0046861 A1* | 2/2021 | Li | G06V 10/30 |
| 2021/0162913 A1 | 6/2021 | Neukam | |
| 2022/0105862 A1* | 4/2022 | Unterweger | B60Q 11/005 |
| 2022/0227286 A1* | 7/2022 | Bonart | B60Q 1/08 |
| 2022/0268416 A1 | 8/2022 | Hummel et al. | |

FOREIGN PATENT DOCUMENTS

| | | |
|---|---|---|
| DE | 102012112690 | 6/2014 |
| DE | 102015016375 | 6/2017 |
| DE | 102018101047 | 7/2019 |
| DE | 102018103487 | 8/2019 |

* cited by examiner

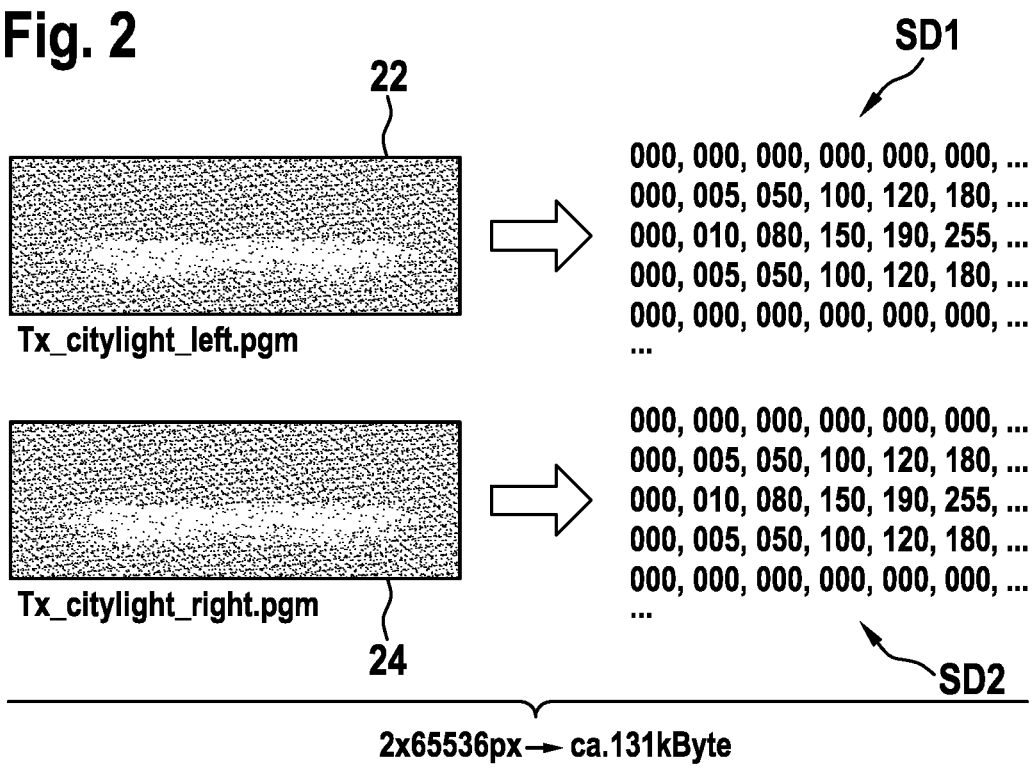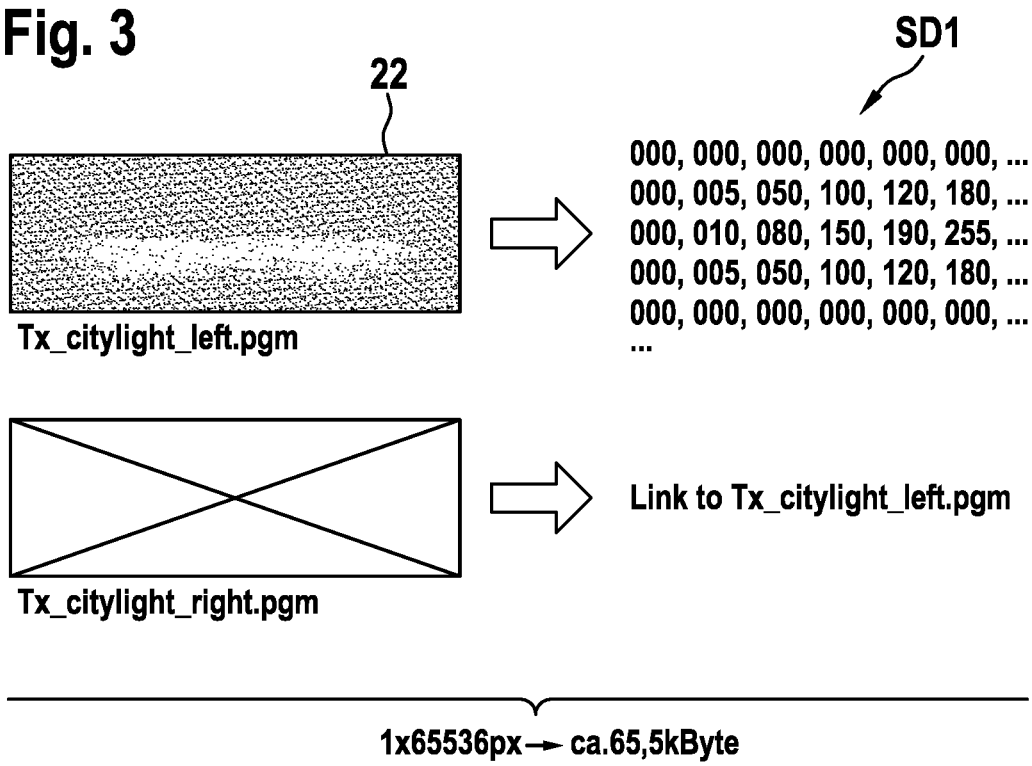

METHOD, SYSTEM, AND COMPUTER PROGRAM PRODUCT FOR STORING LIGHT DISTRIBUTIONS OF A MATRIX HEADLIGHT SYSTEM

CROSS-REFERENCE TO RELATED APPLICATION

This application claims priority on German Patent Application No 10 2021 124 054.9 filed Sep. 17, 2021, the entire disclosure of which is incorporated herein by reference.

BACKGROUND

Field of the Invention. The invention relates to a method, system, and computer program product for storing light distributions of a matrix headlight system.

Related Art Matrix headlight systems typically comprise two matrix headlights or matrix light modules and are used increasingly for motor vehicles. These matrix headlights include lighting elements, as light sources, arranged in the shape of a matrix to define a lighting matrix. The individual lighting elements are selectively activatable, deactivatable and adjustable with regard to their light intensity. Thus, the lighting matrix enables very different illumination functions to be implemented. Such an illumination function is, for example, a glare-free high-beam function to avoid blinding oncoming road users with an activated high beam. Another illumination function relates to the particular light conditions in the city or on the highway.

The control data for the light distributions of a high-resolution headlight are created in a vehicle-specific manner and stored in a memory unit or a control unit at the end of the production of the motor vehicle. Each control unit typically includes a flash memory for loading and storing the data. The process of loading new software into a control unit is referred to as flashing, and the software loaded into the control unit is referred to as flashware.

Light distributions of the matrix headlight system usually are stored with up to 84 pixels and with a depth resolution of 6 bits, i.e., 0 to 63 gray levels. This means that a memory space of 1.2 Kbyte in the flash memory of the control unit of a vehicle is required for 10 light distributions of a matrix headlight system. In the case of high-resolution headlight systems with, for example, 65536 pixels and a resolution of 8 bits, i.e., 0 to 255 gray levels, data sizes of 1300 Kbyte for 10 light distributions for a motor vehicle result. However, this increases the flash times and required memory space of the flash memory. It is therefore desirable to reduce the amount of data. However, traditional compression methods are not possible due to legal requirements regarding the light values.

DE 10 2018 101 047 A1 describes a matrix headlight system and a method for correcting pixel trajectories for a trajectory-based allocation of characteristic features of a pattern projection of the matrix headlight system to headlight segments of the matrix headlight system.

U.S. Pat. No. 10,878,735 B2 describes lighting modules that emit segmented light beams and are controlled by a common processor having a single video output interface.

DE10 2012 112 690 A1 discloses a method for representing a light intensity distribution of a light source to be tested.

DE 10 2010 033 351 A1 discloses a system for controlling a headlight of a motor vehicle for the segment-wise illumination of an illumination range.

DE 10 2018 103 487 B4 discloses a method for operating an illumination apparatus with a headlight for a motor vehicle. The headlight has an overall light distribution consisting of plural light distributions. With the aid of an algorithm, the overall light distribution is generated as a function of a desired light distribution and a target apparatus of the headlight.

U.S. Pat. No. 9,732,927 B2 discloses a method for calibrating an illumination apparatus that has plural lighting means as light sources, each generating an individual light distribution.

US 2008/0195276 A1 discloses an image array sensor comprising a plurality of pixels and an analog-to-digital converter for quantizing the signals of the pixels into a digital value.

A task of the present invention is therefore to create a method, system, and computer program product for storing light distributions of a matrix headlight system, characterized by efficient use of memory capacities and by short flash times.

SUMMARY OF THE INVENTION

According to a first aspect, the invention relates to a method for storing light distributions of a matrix headlight system. The matrix headlight system includes at least a first matrix light module, a control module, and a memory unit. The matrix light module includes lighting elements arranged in the shape of a matrix and respectively emitting light with an adjustable light distribution, and control elements individually adjust the radiated light intensity, the radiation direction, and/or the focus of the light distribution of the respective lighting element. The method includes the following method steps:

loading, from a memory unit, first control data for lighting means of the first matrix light module for generating a first light distribution for a specific illumination function;

feeding the first control data for the lighting means of the first matrix light module to a comparison module;

loading, from the memory unit, second control data for the lighting means of the first matrix headlight or for lighting means of a second matrix light module for generating a second light distribution for a specific illumination function;

feeding the second control data for the lighting means of the first matrix light module or for the lighting means of the second matrix light module to the comparison module;

comparing the first control data for the lighting means of the first matrix light module and the second control data for the lighting means of the first matrix light module or for the lighting means of the second matrix light module with one another to determine whether there is a similarity or equality between the first control data and the second control data;

storing the first control data for the first light distribution or the second control data for the second light distribution if there is a similarity or equality between the first control data for the first light distribution and the second control data for the second light distribution;

linking the second control data for the second light distribution by means of a link to the control data for the first light distribution, or linking the first control data for the first light distribution by means of a link to the second control data for the second light distribution.

In one embodiment, the illumination function is a low beam or high beam or city beam or highway beam or country road beam.

In some embodiments, the file size of the stored control data for a light distribution includes at least 65536 pixels with a depth resolution of 8 bits, i.e., 0-255 gray levels.

The comparison of the first control data with the second control data takes place pixel by pixel in accordance with some aspects of this disclosure.

According to a second aspect, the invention relates to a system for storing light distributions of a matrix headlight system. The matrix headlight system includes at least a first matrix light module, a control module, and a memory unit. The matrix light module includes lighting elements arranged in the shape of a matrix and capable respectively of emitting light with an adjustable light distribution. The matrix light module further includes control elements for individually adjusting the radiated light intensity, the radiation direction, and/or the focus of the light distribution of the respective lighting element. The system is designed to carry out the following method steps:

loading, from the memory unit, first control data for lighting means of the first matrix light module for generating a first light distribution for a specific illumination function;

feeding the first control data for the lighting means of the first matrix light module to a comparison module;

loading, from the memory unit, second control data for the lighting means of the first matrix light module or for lighting means of a second matrix light module for generating a second light distribution for a specific illumination function;

feeding the second control data for the lighting means of the first matrix light module or for the lighting means of the second matrix light module to the comparison module;

comparing the first control data for the lighting means of the first matrix light module and the second control data for the lighting means of the first matrix light module or for the lighting means of the second matrix light module with one another in order to determine whether there is a similarity or equality between the first control data and the second control data;

storing the first control data for the first light distribution or the second control data for the second light distribution if there is a similarity or equality between the first control data for the first light distribution and the second control data for the second light distribution;

linking the second control data for the second light distribution by means of a link to the control data for the first light distribution, or linking the first control data for the first light distribution by means of a link to the second control data for the second light distribution.

The illumination function may be a low beam or high beam or city beam or highway beam or country road beam.

In some embodiments, the file size of the stored control data for a light distribution includes at least 65536 pixels with a depth resolution of 8 bits, i.e., 0-255 gray levels.

The comparison of the first control data with the second control data takes place pixel by pixel in some embodiments.

A third aspect of the invention relates to a computer program product including an executable program code configured to carry out the method according to the first aspect.

The invention is explained in further detail below on the basis of an exemplary embodiment shown in the drawings.

BRIEF DESCRIPTION OF THE DRAWINGS

FIG. 2 is a schematic representation of the storing of control data for light distributions of a matrix headlight system.

FIG. 3 is a schematic representation of the storing control data for light distributions of a matrix headlight system according to the invention.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Figure 1:
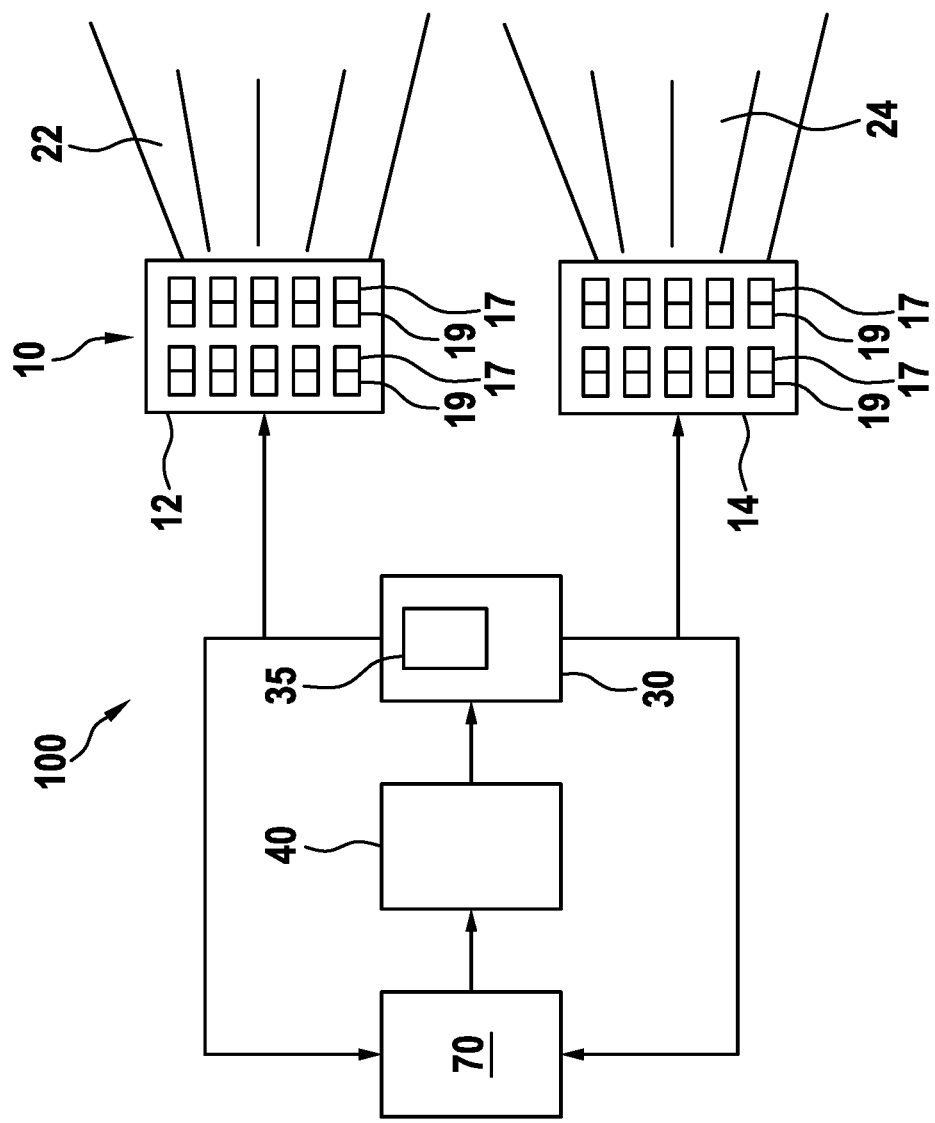
FIG. 1 is a schematic representation of a system according to the invention for storing light distributions of a matrix headlight system.

FIG. 1 shows the system 100 according to the invention for storing light distributions of a matrix headlight system 10. The matrix headlight system 10 includes at least a first matrix light module 12. Furthermore, a second matrix light module 14 may be provided. The matrix light modules 12, 14 have lighting elements 17 that respectively emit light with an adjustable light distribution. The lighting elements 17 are light-emitting diodes (LEDs) arranged in the shape of a matrix. Each lighting element 17 is connected to a control element 19 that is operative to adjust the radiated light intensity, the radiation direction, and/or the focus of the light distribution. Each lighting element 17 can thus be individually adjusted with regard to its light distribution. The superimposition of the individual light distributions emanating from the individual lighting elements 17 results in a first light distribution 22 for the first matrix light module 12 and a second light distribution 24 for the second matrix light module 14.

The control elements 19 are in turn controlled by means of control data SD by a control module 30 to generate a desired light distribution 22, 24 for a specific traffic and environmental situation, such as an illumination function for parking beam, low beam, city beam, highway beam, or high beam. The control module 30 is equipped with a processor 35 for performing control operations for generating an illumination function and with a memory unit 40 for storing the control data SD for the various light distributions. In particular, by means of automatic driving functions, which are, for example, stored as software applications in the processor 35, it can be recognized which light distribution 22, 24 and thus illumination function is to be adjusted for a specific environmental situation.

The control data SD for the individual control elements 19 of the lighting elements 17 are stored in the memory unit 40.

When a specific illumination function is to be activated, the control module 30 loads, from the memory unit 40, first control data SD1 stored therein for the various lighting elements 17 of the first matrix light module 12 for generating the first light distribution 22 as well as second control data SD2 for the various lighting elements 17 of the second matrix light module 14 for generating the second light distribution 24 in relation to the respectively desired illumination function. The control module 30 uses the control data SD1, SD2 for controlling the control elements 19 of the lighting elements 17. However, the second light distribution 24 may also be a light distribution of the first matrix light module 12 that is controlled with other control data SD in comparison with the first light distribution 22.

A "processor" may be understood in connection with the invention to mean a machine or electronic circuitry or a high-performance computer, for example. In particular, a processor may be a master processor (central processing unit (CPU)), a microprocessor, or a microcontroller, for example an application-specific integrated circuit or a digital signal processor, optionally in combination with a memory unit for storing program instructions, etc. A processor may also be understood to mean a virtualized processor, a virtual machine, or a soft CPU. For example, it may also be a programmable processor equipped with configuration steps for carrying out the above-mentioned method according to the invention or configured with configuration steps in such a way that the programmable processor realizes the features according to the invention of the method, the component, the modules, or other aspects and/or partial aspects of the invention. In addition, highly parallel computing units and high-performance graphics modules may be provided.

A "memory unit" or "memory module" and the like may, for example, be understood in connection with the invention to mean a non-volatile memory in the form of a flash memory (Flash EEPROM) or a permanent memory, such as a hard drive.

A "module" may, for example, be understood in connection with the invention to mean a processor and/or a memory unit for storing program instructions. For example, the processor is specifically configured to execute the program instructions in such a way that the processor executes functions in order to implement or realize the method according to the invention or a step of the method according to the invention.

Usually, control data SD1, SD2 are stored for up to 84 lighting elements 17 or pixels and with a depth resolution of 6 bits, i.e., of up to 0-63 gray levels, for generating a light distribution 22, 24. This means that for ten light distributions 22, 24 of a matrix headlight system 10 with two matrix light modules 12, 14 for various illumination functions, a memory space of 1.2 Kbyte is required for storing the control data SD1, SD2 in the memory unit 40 designed as a flash memory, for example.

However, for high-resolution matrix headlight systems 10 that can adapt to environmental characteristics precisely and automatically by means of automatic driving functions, a significantly higher data volume results. For generating a light distribution 22, 24 of a high-resolution matrix headlight system 10, control data SD1, SD2 for 65536 lighting elements 17 or pixels and with a depth resolution of 8 bits, i.e., up to 255 gray levels, are required, for example. This results in a data size of 1300 Kbyte for a motor vehicle for ten light distributions 22, 24 of a matrix headlight system 10 with two matrix light modules 12, 14. However, this increases the required memory space of the flash memory 40 and the flash times for loading the control data SD1, SD2 for the respective light distribution 22, 24 for a desired illumination function.

However, for specific illumination functions in symmetrically designed matrix headlight systems 10, the light distribution 22 of the first matrix light module 12 and the light distribution 24 of the second matrix light module 14 are equal or identical, as shown in FIG. 2. On the left side of FIG. 2, the light distribution 22 of the first matrix light module 12 and the light distribution 24 of the matrix light module 14 are depicted schematically, while on the right side, the associated control data SD1, SD2 for the gray values of some of the individual lighting elements 17 or pixels for generating the respective light distribution 22, 24 are represented in a decimal representation, for example the values 010, 080, 150, etc. As can be seen in FIG. 2, the representations of the first light distribution 22 and of the second light distribution 24 are identical. Such an equality of the light distributions 22, 24 results primarily for low beam, high beam, city beam, or highway beam.

FIG. 3 shows that, if the first light distribution 22 for the first matrix light module 12 is equal or similar to the second light distribution 24 for the second matrix light module 14, a changed storing of the control data SD1, SD2 for the first light distribution 22 and the second light distribution 24 is performed. For this purpose, the first and second control data SD1, SD2 of the two light distributions 22, 24 are fed to a comparison module 70, which is shown in FIG. 1. In the comparison module 70, the first control data SD1 for the lighting elements 17 of the first matrix light module 12 for generating the first light distribution 22 and the second control data SD2 of the corresponding lighting elements 17 of the second matrix light module 14 for generating the second light distributions 24 are compared with one another pixel by pixel. If it is determined in the comparison that the first control data SD1 for the lighting elements 17 of the first matrix light module 12 for generating the first light distribution 22 and the second control data SD2 for the corresponding lighting elements 17 of the second matrix light module 14 for generating the second light distributions 24 are equal or identical, only the first control data SD1 for the first light distribution 22 are stored in the memory unit 40, while the second control data SD2 for the second light distribution 24 are marked as equal or identical to the first control data SD1 for generating the first light distribution 22. However, it is also possible for the second control data SD2 for the second light distribution 24 to be stored in the memory unit 40, while the first control data SD1 for the first light distribution 22 are marked as equal or identical to the second control data SD2 for the second light distribution 24.

To retrieve the second control data SD2 for the second light distribution 24, a link is provided that refers to the first control data SD1 for the first light distribution 22, or vice versa. In this way, the memory requirement for storing the first and second control data SD1, SD2 for the two light distributions 22, 24 can be reduced by half. While a memory space of 131 Kbyte is required for the first and second control data SD1, SD2, shown in FIG. 2, for generating the two light distributions 22, 24 with a number of 65536 lighting elements 17 or pixels and a memory depth of 8 bits, storing the first and second control data SD1, SD2 for the two light distributions 22, 24 in FIG. 3 only requires a memory space of 65.5 Kbyte. Thus, the memory space required for the first and second control data SD1, SD2 for high-resolution light distributions 22, 24 can thereby be significantly reduced.

Figure 4:
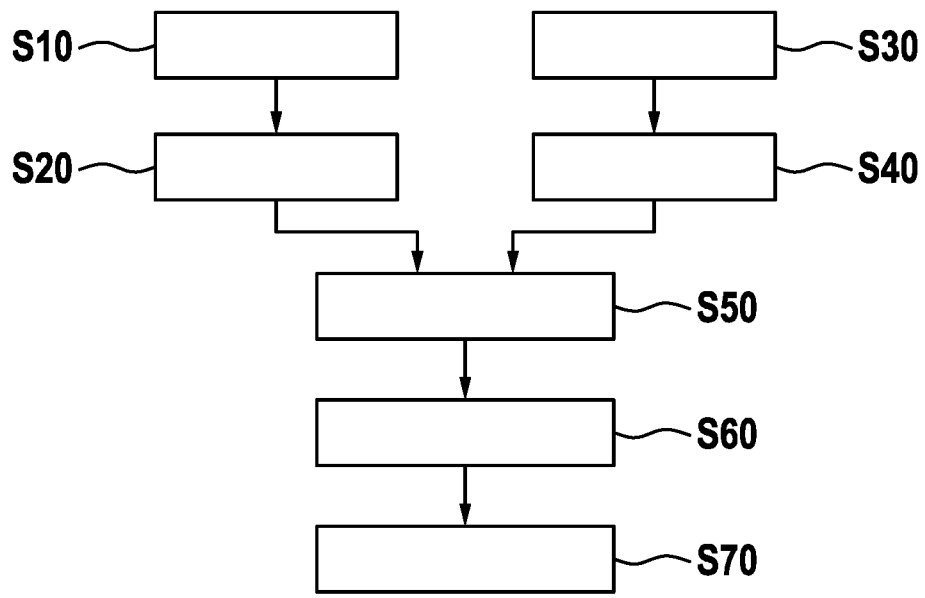
FIG. 4 is a flow chart for explaining the individual method steps of a method according to the invention.

A method for storing light distributions of a matrix headlight system 10 comprising at least a first matrix light module 12 includes the steps shown in FIG. 4.

In a step S10, first control data SD1 for lighting means 17 of the first matrix light module 12 for generating a first light distribution 22 for a specific illumination function are loaded from a memory unit 40.

In a step S20, the first control data SD1 for the lighting means 17 of the first matrix light module 12 are fed to a comparison module 70.

In a step S30, second control data SD2 for the lighting means 17 of the first matrix light module 12 or for lighting means 17 of a second matrix light module 14 for generating a second light distribution 24 for a specific illumination function are loaded from a memory unit 40.

In a step S40, the second control data SD2 for the lighting means 17 of the first matrix light module or for the lighting means 17 of the second matrix light module 14 are fed to the comparison module 70.

In a step S50, the first control data SD1 for the lighting means 17 of the first matrix light module 12 and the second control data SD2 for the lighting means 17 of the first matrix light module 12 or for the lighting means 17 of the second matrix light module 14 are compared with one another pixel by pixel in order to determine whether there is a similarity or equality between the first control data SD1 and the second control data SD2.

In a step S60, the first control data SD1 for the first light distribution 22 or the second control data SD2 for the second light distribution 24 are stored if there is a similarity or equality between the first control data SD1 for the first light distribution 22 and the second control data SD2 for the second light distribution 24.

In a step S70, the second control data SD2 for the second light distribution 24 are linked by means of a link to the first control data SD1 for the first light distribution 24, or the first control data SD1 for the first light distribution 22 are linked by means of a link to the second control data SD2 for the second light distribution 24.

Thus, with the present invention, the required memory space in a memory unit 40 of a vehicle for controlling light distributions 22, 24 of high-resolution matrix headlight systems 10 can be significantly reduced. In particular, the memory space can be reduced by half. This means that the flash times for loading the control data SD1, D2 for the lighting elements 17 of the matrix headlight system 10 for generating the light distributions 22, 24 are reduced, whereby faster activation of the desired illumination function is made possible.

Figure 5:
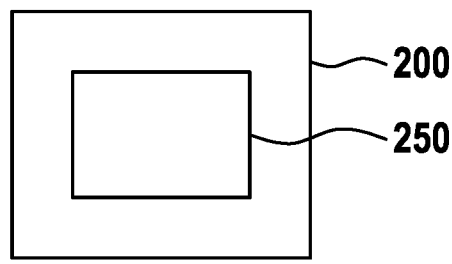
FIG. 5 shows a computer program product according to one embodiment of the third aspect of the invention.

FIG. 5 schematically illustrates a computer program product 200 including an executable program code 259 configured to carry out the method according to the first aspect, as illustrated in the flow chart of FIG. 4.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

What it claims is:

1. A method for storing light distributions of a matrix headlight system (10), the matrix headlight system (10) including at least a first matrix light module (12), a control module (30), and a memory unit (40), the matrix light module (12) including lighting elements (17) arranged in a shape of a matrix and respectively configured to emit light with an adjustable light distribution, and control elements (19) for individually adjusting the radiated light intensity, the radiation direction, and/or the focus of the light distribution of the respective lighting element (17), the method comprising:

loading (S10), from the memory unit (40), first control data (SD1) for lighting means (17) of the first matrix light module (12) for generating a first light distribution (22) for a specific illumination function;

feeding (S20) the first control data (SD1) for the lighting means (17) of the first matrix light module (12) to a comparison module (70);

loading (S30), from the memory unit (40), second control data (SD2) for the lighting means (17) of the first matrix light module (12) or for lighting means (17) of a second matrix light module (14) for generating a second light distribution (24) for a specific illumination function;

feeding (S40) the second control data (SD2) for the lighting means (17) of the first matrix light module (12) or for the lighting means (17) of the second matrix light module (14) to the comparison module (70);

performing a comparison (S50) of the first control data (SD1) for the lighting means (17) of the first matrix light module (12) and the second control data (SD2) for either the lighting means (17) of the first matrix light module (12) or the lighting means of the second matrix light module (14) to determine whether there is a similarity or equality between the first control data (SD1) and the second control data (SD2);

storing (S60) only one of the first control data (SD1) for the first light distribution (22) or the second control data (SD2) for the second light distribution (24) if there is a similarity or equality between the first control data (SD1) for the first light distribution (22) and the second control data (SD2) for the second light distribution (24);

linking (S70) the second control data (SD2) for the second light distribution (24) to the control data (SD1) for the first light distribution (24), or linking the first control data (SD1) for the first light distribution (22) to the second control data (SD2) for the second light distribution (24) when there is a similarity or equality between the first control data (SD1) for the first light distribution (22) and the second control data (SD2) for the second light distribution (24).

2. The method of claim 1, wherein the illumination function is a low beam or high beam or city beam or highway beam or country road beam.

3. The method of claim 1, wherein a file size of the stored control data (SD1, SD2) for a light distribution (22, 24) includes at least 65536 pixels with a depth resolution of 8 bits to define 0-255 gray levels.

4. The method of claim 1, wherein the step of comparing the first control data (SD1) with the second control data (SD2) takes place pixel by pixel.

5. A non-transitory computer readable medium containing a computer readable program product (200) including an executable program code (250) configured to carry out the method of claim 1.

6. A system (100) for storing light distributions of a matrix headlight system (10) that comprises at least a first matrix light module (12), a control module (30), and a memory unit (40), the matrix light module (12) including lighting elements (17) arranged in a shape of a matrix, the lighting elements (17) respectively being configured to emit light with an adjustable light distribution, the system (100) further comprising a plurality of control elements (19) for individually adjusting the radiated light intensity, the radiation direction, and/or the focus of the light distribution of the respective lighting element (17), wherein the system is designed to carry out the following method steps:

- loading (S10), from the memory unit (40), first control data (SD1) for lighting means (17) of the first matrix light module (12) for generating a first light distribution (22) for a specific illumination function;
- feeding (S20) the first control data (SD1) for the lighting means (17) of the first matrix light module (12) to a comparison module (70);
- loading (S30), from the memory unit (40), second control data (SD2) for the lighting means (17) of the first matrix light module (12) or for lighting means (17) of a second matrix light module (14) for generating a second light distribution (24) for a specific illumination function;
- feeding (S40) the second control data (SD2) for the lighting means (17) of the first matrix light module (12) or for the lighting means (17) of the second matrix light module (14) to the comparison module (70);
- performing a comparison (S50) of the first control data (SD1) for the lighting means (17) of the first matrix light module (12) and the second control data (SD2) for either the lighting means (17) of the first matrix light module or the lighting means (17) of the second matrix light module (14) to determine whether there is a similarity or equality between the first control data (SD1) and the second control data (SD2);
- storing (S60) only one of the first control data (SD1) for the first light distribution (22) or the second control data (SD2) for the second light distribution (24) if there is a similarity or equality between the first control data (SD1) for the first light distribution (22) and the second control data (SD2) for the second light distribution (24);
- linking (S70) the second control data (SD2) for the second light distribution (24) by means of a link to the control data (SD1) for the first light distribution (24), or linking the first control data (SD1) for the first light distribution (22) by means of a link to the second control data (SD2) for the second light distribution (24) when there is a similarity or equality between the first control data (SD1) for the first light distribution (22) and the second control data (SD2) for the second light distribution (24).

7. The system (100) of claim 6, wherein the illumination function is a low beam or high beam or city beam or highway beam or country road beam.

8. The system (100) of claim 6, wherein a file size of the stored control data (SD1, SD2) for a light distribution (22, 24) includes at least 65536 pixels with a depth resolution of 8 bits to define 0-255 gray levels.

9. The system (100) of claim 6, wherein the comparison of the first control data (SD1) with the second control data (SD2) takes place pixel by pixel.

\* \* \* \* \*